United States Patent
Shimizu et al.

(10) Patent No.: US 8,140,224 B2
(45) Date of Patent: Mar. 20, 2012

(54) DIAGNOSIS APPARATUS FOR PASSENGER PROTECTION SYSTEM

(75) Inventors: Nobuyoshi Shimizu, Okazaki (JP); Masahiko Itoh, Anjo (JP)

(73) Assignee: Denso Corporation, Kariya (JP)

( * ) Notice: Subject to any disclaimer, the term of this patent is extended or adjusted under 35 U.S.C. 154(b) by 1170 days.

(21) Appl. No.: 11/982,777

(22) Filed: Nov. 5, 2007

(65) Prior Publication Data

US 2008/0109138 A1    May 8, 2008

(30) Foreign Application Priority Data

Nov. 8, 2006  (JP) ................. 2006-302506
Aug. 10, 2007 (JP) ................. 2007-208700

(51) Int. Cl.
*B60R 22/00* (2006.01)
(52) U.S. Cl. ............... 701/45; 701/49; 180/232
(58) Field of Classification Search .............. 701/45, 701/46, 49; 280/734, 730.2, 735; 180/167, 180/168, 232
See application file for complete search history.

(56) References Cited

U.S. PATENT DOCUMENTS

| | | | |
|---|---|---|---|
| 5,569,988 A | 10/1996 | Kokami et al. | |
| 5,818,179 A | 10/1998 | Kokami et al. | |
| 5,865,463 A * | 2/1999 | Gagnon et al. | 280/735 |
| 5,923,133 A | 7/1999 | Menegoli | |
| 6,012,736 A * | 1/2000 | Hansen et al. | 280/735 |
| 6,140,821 A * | 10/2000 | Fendt et al. | 324/502 |
| 7,368,951 B2 | 5/2008 | Iwasaki | |

FOREIGN PATENT DOCUMENTS

| | | |
|---|---|---|
| JP | 06-224730 | 8/1994 |
| JP | 07-079591 | 3/1995 |
| JP | 08-282429 | 10/1996 |
| JP | 10-303733 | 11/1998 |
| JP | 11-034794 | 2/1999 |
| JP | 2004-56546 | 2/2004 |

OTHER PUBLICATIONS

Office action dated May 19, 2011 in corresponding Japanese Application No. 2007-208700.

* cited by examiner

*Primary Examiner* — Gertrude Arthur Jeanglaude
(74) *Attorney, Agent, or Firm* — Harness, Dickey & Pierce, PLC

(57) ABSTRACT

A diagnosis apparatus for an airbag system includes a squib, a driving transistor connected in series with the squib to activate the squib by driving current when driven by a control circuit. The control circuit drives the driving transistor to supply small monitoring current periodically to the squib under slew rate control. As a result, a change rate of rise and fall of each monitoring current is reduced to about 0.1 mA/μs or less thereby reducing radio noise.

15 Claims, 5 Drawing Sheets

US 8,140,224 B2

DIAGNOSIS APPARATUS FOR PASSENGER PROTECTION SYSTEM

CROSS REFERENCE TO RELATED APPLICATION

This application is based on and incorporates herein by reference Japanese Patent Applications No. 2006-302506 filed on Nov. 8, 2006 and No. 2007-208700 filed on Aug. 10, 2007.

FIELD OF THE INVENTION

The present invention relates to a diagnosis apparatus for a passenger protection system, and particularly to a diagnosis apparatus which generates less noise.

BACKGROUND OF THE INVENTION

In conventional passenger protection systems such as disclosed in U.S. Pat. No. 5,923,133 (JP 11-55984A), disconnection or shorting of electric wires in an airbag system is diagnosed by periodically supplying a small monitoring current to an airbag igniter circuit. For instance, as shown in FIG. 10, a squib 1 of an airbag is connected to a driving transistor TR1 and a switching transistor TR2 through respective resistors R1 and R2. The driving transistor TR1 is connected to an electric power source, and the switching transistor TR2 is grounded. The driving transistor TR1 is connected to a microcomputer 2 to be controlled thereby through an auxiliary transistor TR5. The switching transistor TR2 is also connected to the microcomputer 2 to be controlled thereby.

In this system, a small monitoring current Im much lower than the predetermined level is periodically or intermittently supplied to the squib 1 by slightly turning on the transistors TR1 and/or TR2 under control of the microcomputer 2, so that the squib 1 produces a small voltage. The microcomputer 2 diagnoses the airbag system by monitoring whether the small voltage is produced across the squib 1.

The monitoring current may be, as shown in FIG. 11, about 10 mA in amplitude and rises and falls at a change rate of about 2 mA/µs and −2 mA/µs. This current change generates electrical noise, which changes electric field strength sharply as shown in FIG. 12 and is received by a vehicle-mounted radio receiver. To remove the noise, as shown in FIG. 13, capacitors C1 and C2 are connected to both terminals of the squib 1 and ground to operate as noise filters. These capacitors C1 and C2 must be provided outside an electronic circuit board, resulting in increased cost.

SUMMARY OF THE INVENTION

It is therefore an object of the present invention to provide a diagnosis apparatus for a passenger protection system, which generates less noise without using noise filtering capacitors.

According to an aspect of the present invention, a diagnosis apparatus has an electric device associated with a passenger protection device. A monitoring current is supplied intermittently to the electric device. The electric device is diagnosed based on a signal developed by the electric device in response to the monitoring current. The monitoring current is controlled in a slew rate manner so that the monitoring current rises and falls at a rate of less than ±0.5 mA/µs.

The electric device may be a squib for activating an airbag. The monitoring current is much smaller than a current, which is required to ignite the squib at the time of collision, and the slew rate is preferably about ±0.1 mA/µs.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE EMBODIMENT

First Embodiment

Figure 1:
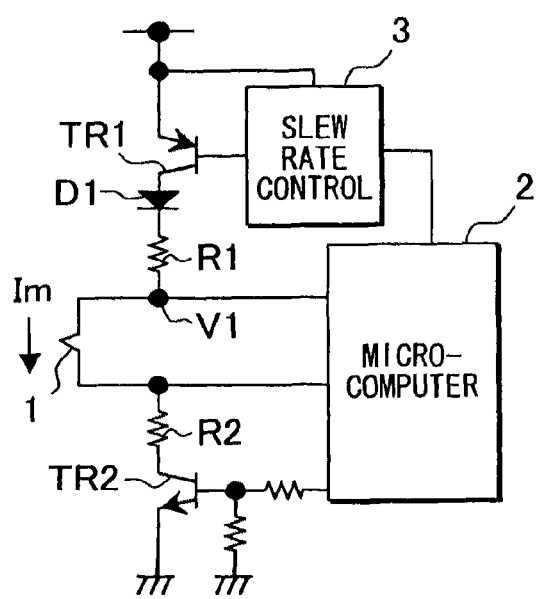
FIG. 1 is a circuit diagram showing a diagnosis apparatus for an airbag system as a first embodiment of the present invention.
Figure 3:
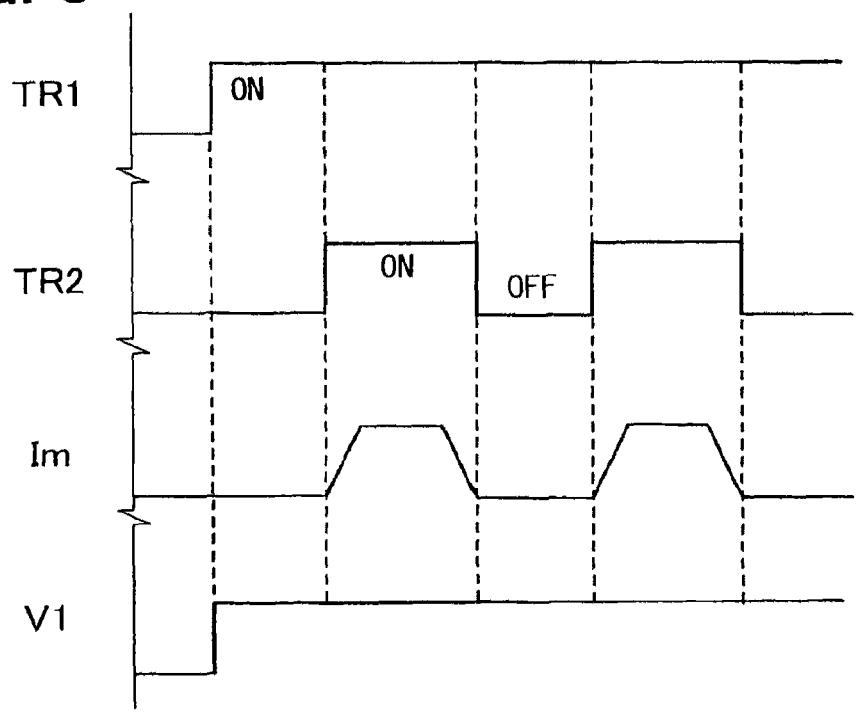
FIG. 3 is an operation diagram showing signals and operations in the first embodiment.
Figure 10:
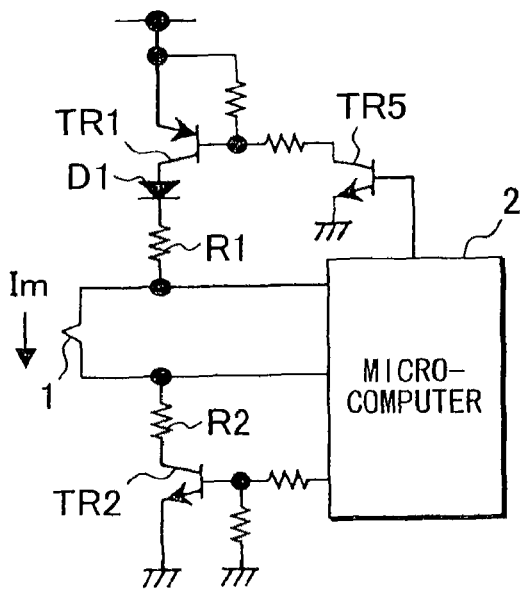
FIG. 10 is a circuit diagram showing a conventional diagnosis apparatus for an airbag system.

Referring to FIG. 1, a diagnosis apparatus for an airbag system has an igniter 1, a microcomputer 2, a driving transistor TR1 and a switching transistor TR2, which are provided in the similar manner as in the conventional apparatus shown in FIG. 10. Specifically, one terminal of the squib 1 is connected to the driving transistor TR1 through a resistor R1 and a diode D1, and connected to an electric power source through the driving transistor TR1. The other terminal of the squib 1 is connected to the ground through a resistor R2 and the switching transistor TR2. Both transistors TR1 and TR2 are connected to the microcomputer 2 to be controlled thereby as shown in FIG. 3.

While the driving transistor TR1 is slightly, not fully, in the ON condition, the squib 1 is connected to the power source. When the switching transistor TR2 is also slightly turned on in this condition, a small monitoring current Im, which is about 10 mA that is insufficient to ignite the squib 1, flows in the squib 1.

A slew rate control circuit 3 is connected between the driving transistor TR1 and the microcomputer 2 to control the driving transistor TR1 in the slew rate control manner. The small monitoring current Im of about 10 mA is supplied to the squib 1 through the driving transistor TR1 and the switching transistor TR2 and is thus controlled to rise and fall slowly as shown in FIG. 3. The microcomputer 2 monitors a voltage developed across the squib 1 when the monitoring current Im is supplied by driving both transistors TR1 and TR2. Thus, the microcomputer 2 diagnoses the airbag system, for example squib, based on the voltage of the squib 1.

Figure 2:
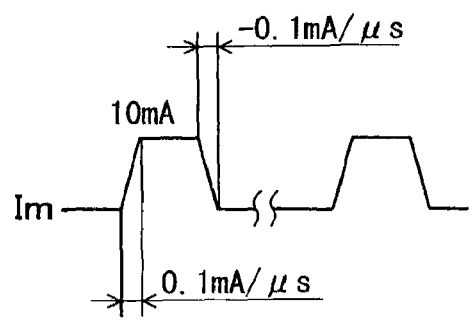
FIG. 2 is a signal diagram showing monitoring current used in the first embodiment.
Figure 11:
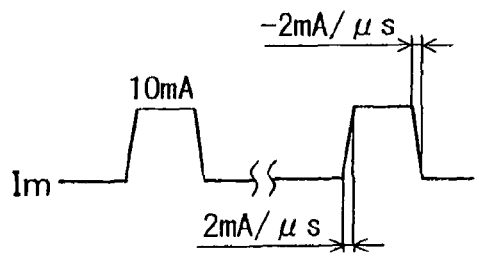
FIG. 11 is a signal diagram showing a monitoring current used in the conventional apparatus.
Figure 12:
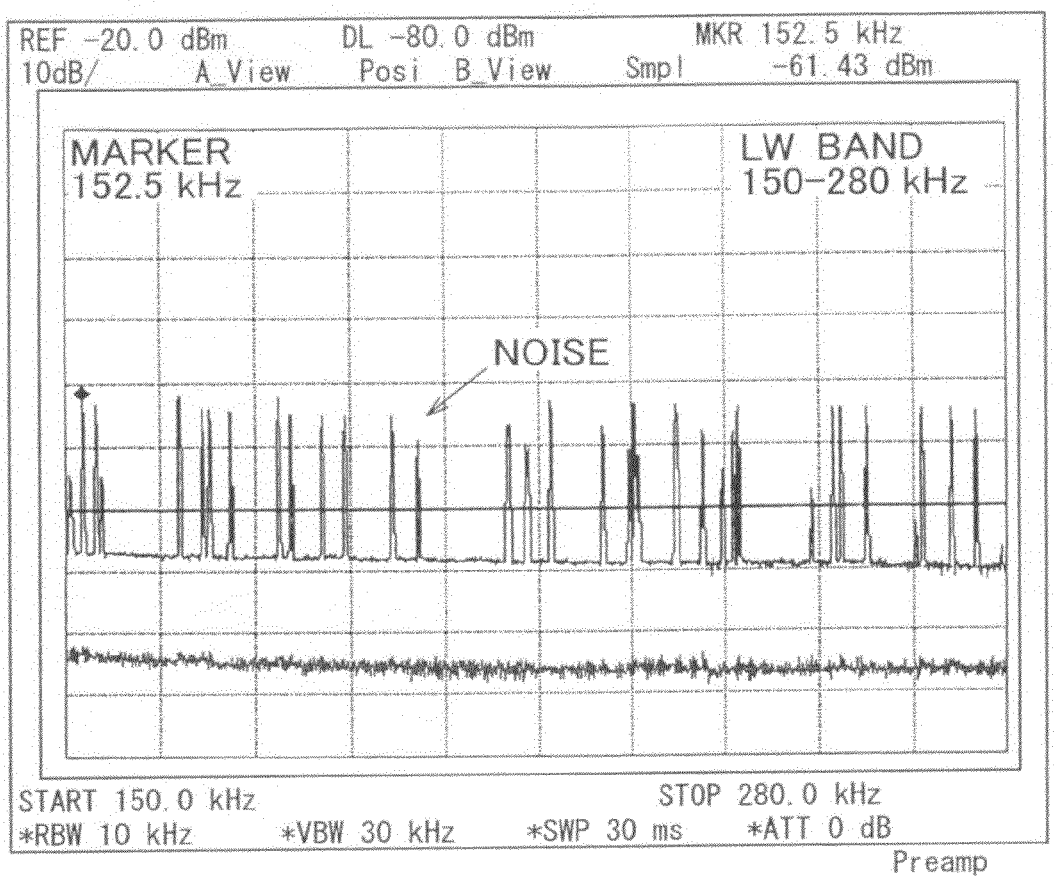
FIG. 12 is a graph showing one example of radio noise generated in the conventional apparatus.

As shown in FIG. 2 in detail, the rising change rate and the falling change rate of the monitoring current Im is controlled by the microcomputer 2 through the slew rate control circuit 3 to be about 0.1 mA/µs and −0.1 mA/µs, respectively, which are about one-twentieth of the conventional change rate shown in FIG. 11, while the amplitude of the monitoring current Im is unchanged. The change rate is not limited to ±0.1 mA/µs. It may be less than ±0.5 mA/µs and different between rise and fall. However, ±0.1 mA/µs is most preferred.

Figure 4:
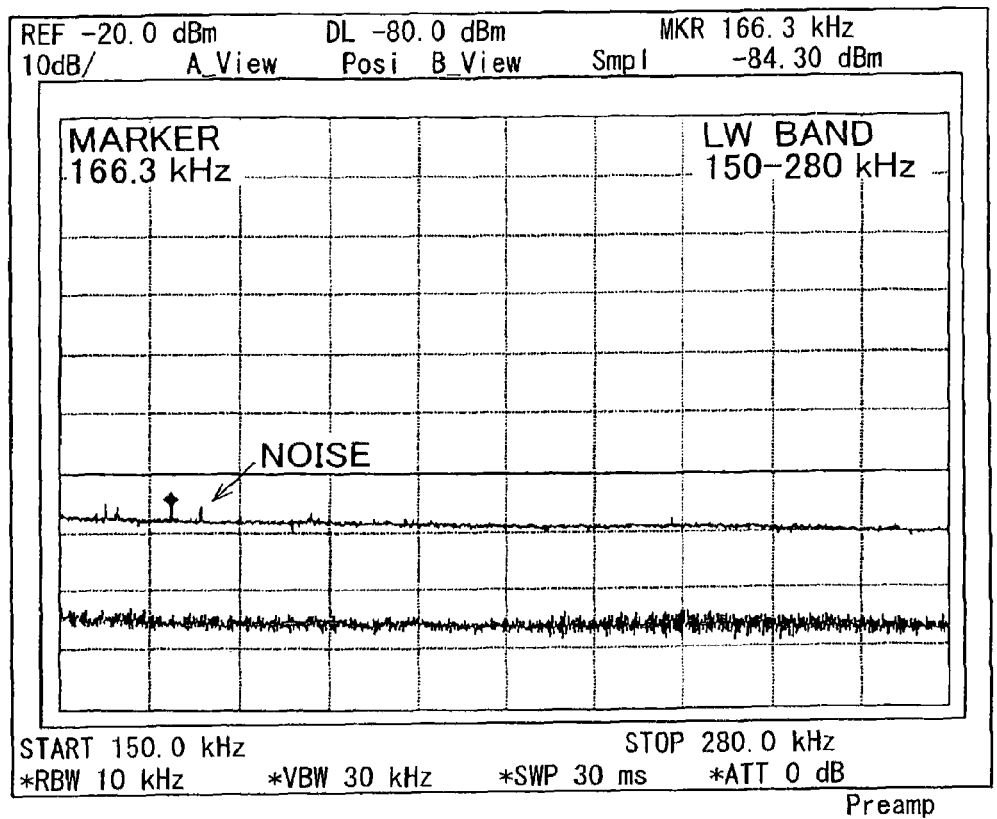
FIG. 4 is a graph showing one example of radio noise generated in the first embodiment when the monitoring current is supplied under slew rate control.
Figure 13:
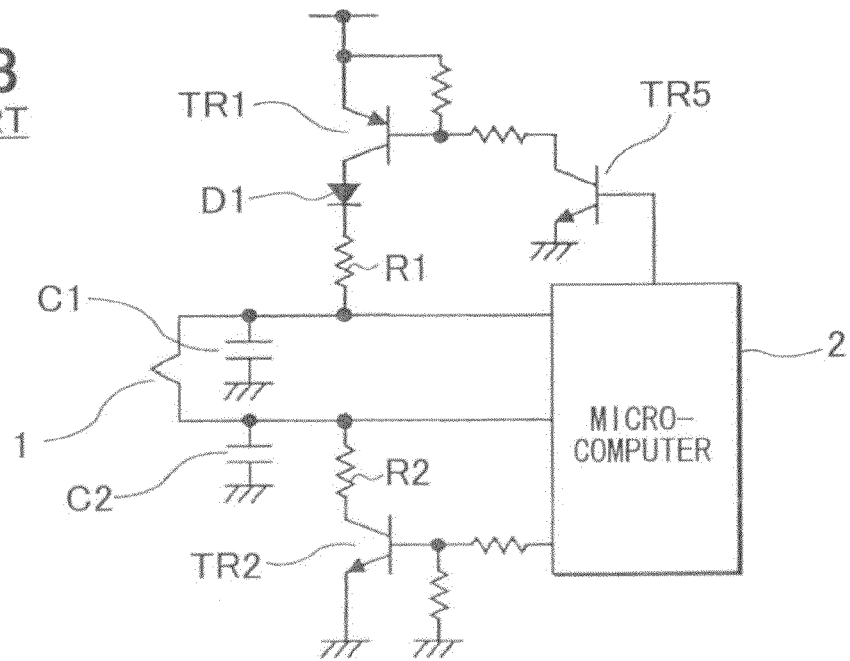
FIG. 13 is a circuit diagram showing another conventional diagnosis apparatus for an airbag system using capacitors for noise reduction.

According to this slew rate control, as shown in FIG. 4, electric field strength of radio noise is remarkably reduced. Specifically, the radio noise is reduced more than 20 dBm without using noise filtering capacitors C1, C2 shown in FIG. 13. It is noted that, in addition to the slew rate control of the monitoring current Im, the positive-side potential V1 of the squib 1 is maintained at the fixed potential as shown in FIG. 3. This can be attained by setting the resistance of the resistor R1 much smaller than that of the resistor R2 to make a voltage drop at the resistor R1 negligible, or by feedback-controlling the potential V1. Therefore, changes in the electric field caused by changes in the monitoring current Im is suppressed. This is also effective to suppress noise.

Second Embodiment

Figure 5:
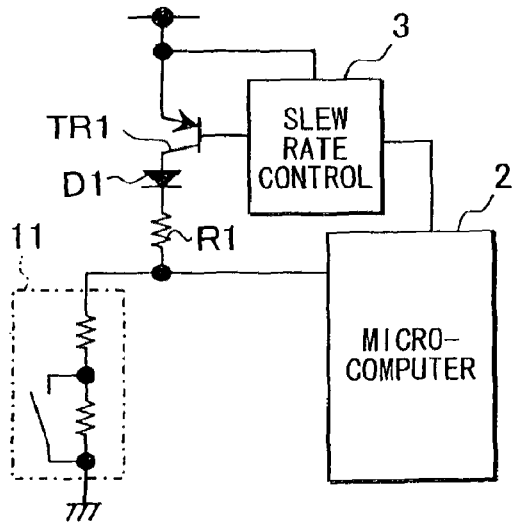
FIG. 5 is a schematic diagram showing a diagnosis apparatus for a seatbelt switch as a second embodiment of the present invention.

In the second embodiment shown in FIG. 5, a seatbelt buckle switch 11, which may be provided for a seatbelt system, is diagnosed. One terminal of the buckle switch 11 is connected to the driving transistor TR1 through the resistor R1 and the diode D1. This terminal is also connected to the microcomputer 2 to be monitored and diagnosed thereby. The other terminal of the buckle switch 11 is grounded. The slew rate control circuit 3 controls the driving transistor TR1 in the slew rate control manner in the similar manner as in the first embodiment, so that the monitoring current Im supplied through the driving transistor TR1 rises and falls slowly. Thus, the radio noise can be reduced as in the first embodiment.

Third Embodiment

Figure 6:
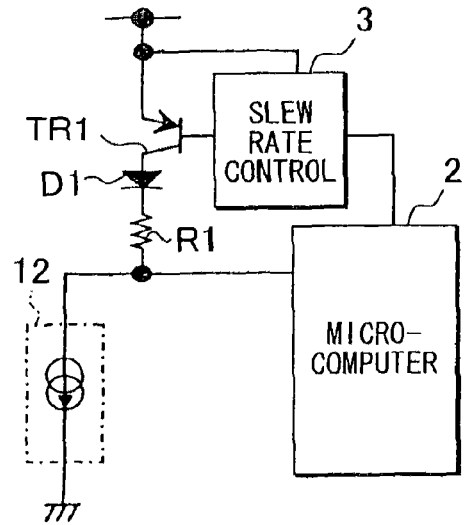
FIG. 6 is a schematic diagram showing a diagnosis apparatus for a seat position sensor as a third embodiment of the present invention.

In the third embodiment shown in FIG. 6, a seat position sensor 12, which may be provided for an airbag system or a seatbelt system, is diagnosed. The seat position sensor 12 may be a Hall element type. One terminal of the seat position sensor 12 is connected to the driving transistor TR1 through the resistor R1 and the diode D1. This terminal is also connected to the microcomputer 2 to be monitored and diagnosed thereby. The other terminal of the seat position sensor 12 is grounded. The slew rate control circuit 3 controls the driving transistor TR1 in the slew rate control manner as in the first and second embodiments, so that the monitoring current Im supplied through the driving transistor TR1 rises and falls slowly. Thus, the radio noise can be reduced as in the first and the second embodiments.

Fourth Embodiment

Figure 7:
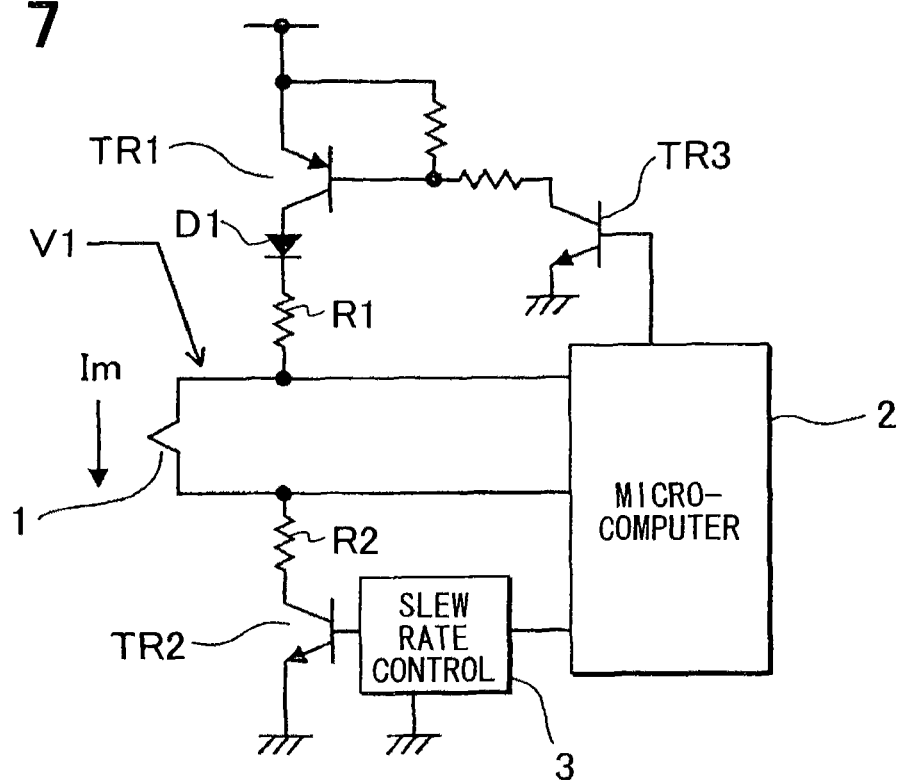
FIG. 7 is a circuit diagram showing a diagnosis apparatus for an airbag system as a fourth embodiment of the present invention.
Figure 8:
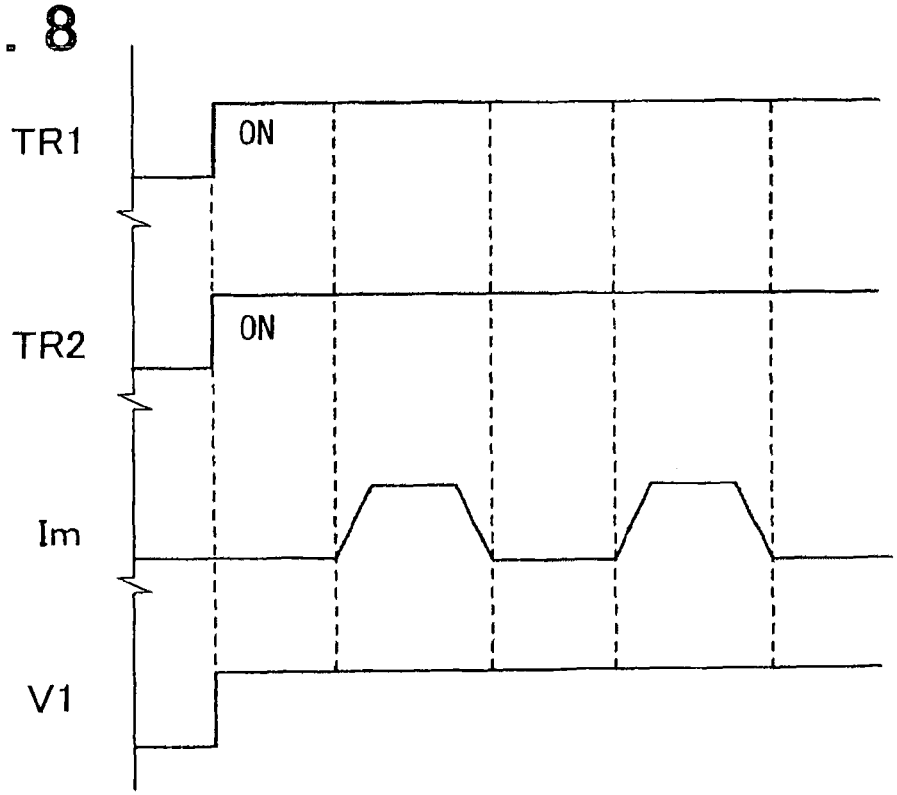
FIG. 8 is an operation diagram showing signals and operations in the fourth embodiment.

In the fourth embodiment shown in FIG. 7, which is a modification of the first embodiment, the slew rate control circuit 3 is provided to control the switching transistor TR2. A switching transistor TR3 is provided to control the driving transistor TR1. The transistors TR1 and TR2 are controlled by the microcomputer 2 as shown in FIG. 8. Specifically, the microcomputer 2 controls the monitoring current Im through the slew rate control circuit 3 in the slew rate manner by finely controlling the ON condition of the transistor TR2, while turning on both transistors TR1 and TR2 slightly or halfway.

Fifth Embodiment

Figure 9:
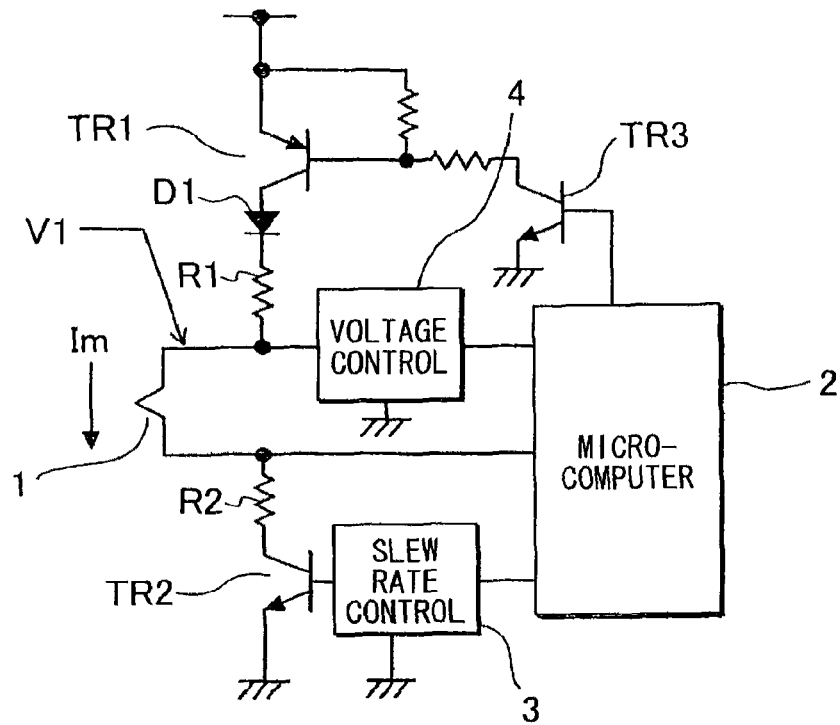
FIG. 9 is a circuit diagram showing a diagnosis apparatus for an airbag system as a fifth embodiment of the present invention.

In the fifth embodiment shown in FIG. 9, which is a modification of the fourth embodiment, a voltage control circuit 4 is provided to control the positive-side potential V1 of the squib 1 to the fixed potential.

The above embodiments may be modified in many ways without departing from the spirit of the invention.

What is claimed is:

1. A diagnosis apparatus for an airbag system, the apparatus comprising:
    means for activating an airbag when a current of more than a predetermined level is supplied;
    means for supplying a current to the activating means intermittently as a monitoring current of less than the predetermined level;
    means for diagnosing the activating means based on a signal developed by the activating means in response to the monitoring current;
    means for controlling the monitoring current in a slew rate manner; and
    means for controlling a voltage of the activating means such that a potential of one end of the activating means is maintained at a fixed level irrespective of the monitoring current, the one end of the activating means is at a positive side of the activating means.

2. The diagnosis apparatus as in claim 1, wherein the controlling means controls the monitoring current to change at a rate of less than ±0.5 mA/µs.

3. A diagnosis apparatus for a passenger protection system, the apparatus comprising:
    an electric device associated with a passenger protection device;
    means for supplying a current including a transistor connected to the electric device to intermittently supply a monitoring current;
    means for diagnosing the electric device based on a signal developed in response to the monitoring current; and
    means for controlling the monitoring current in a slew rate manner so that the monitoring current rises and falls at a rate of less than ±0.5 mA/µs,
    wherein a positive potential of the electric device is controlled to a fixed potential irrespective of the monitoring current.

4. The diagnosis apparatus as in claim 3, wherein the controlling means includes a capacitor connected between a base and a collector of the transistor.

5. The diagnosis apparatus as in claim 3, wherein the controlling means controls a change rate in rising and falling of each monitoring current to be about 0.1 mA/µs or less.

6. The diagnosis apparatus as in claim 5, wherein the controlling means includes a capacitor connected between a base and a collector of the transistor.

7. The diagnosis apparatus as in claim 3, wherein the electric device includes a squib for activating an airbag system.

8. The diagnosis apparatus as in claim 3, wherein the electric device includes a seatbelt switch for detecting operation of a seatbelt by a passenger.

9. The diagnosis apparatus as in claim 3, wherein the electric device includes a seat position sensor for detecting seating position of a passenger.

10. A diagnosis apparatus for a passenger protection system, the apparatus comprising:
- an electric device associated with a passenger protection device;
- a first transistor and a second transistor connected to the electric device to intermittently supply a monitoring current;
- a microcomputer connected to the first transistor and the second transistor, the microcomputer diagnoses the electric device based on a signal developed in response to the monitoring current; and
- a slew rate control circuit connected to the microcomputer, the slew rate control circuit controls the monitoring current in a slew rate manner, wherein a positive potential of the electric device is controlled to a fixed potential irrespective of the monitoring current.

11. The diagnosis apparatus as in claim 10, wherein the first transistor is a driving transistor and the second transistor is a switching transistor.

12. The diagnosis apparatus as in claim 10, wherein the slew rate control circuit controls the monitoring current so that the monitoring current rises and falls at a rate of less than $\pm 0.5$ mA/$\mu$s.

13. The diagnosis apparatus as in claim 12, wherein the electric device includes a squib for activating an airbag system.

14. The diagnosis apparatus as in claim 12, wherein the electric device includes a seatbelt switch for detecting operation of a seatbelt by a passenger.

15. The diagnosis apparatus as in claim 12, wherein the electric device includes a seat position sensor for detecting seating position of a passenger.

* * * * *